A. J. BERRYHILL.
Mowing-Machine.

No. 211,454. Patented Jan. 21, 1879.

UNITED STATES PATENT OFFICE.

ANDREW J. BERRYHILL, OF JAMES COUNTY, TENNESSEE.

IMPROVEMENT IN MOWING-MACHINES.

Specification forming part of Letters Patent No. 211,454, dated January 21, 1879; application filed June 13, 1878.

*To all whom it may concern:*

Be it known that I, ANDREW J. BERRYHILL, a resident of the county of James, in the State of Tennessee, have invented a new and useful Improvement in Mowing-Machines, which improvement is fully set forth in the following specification, reference being had to the accompanying drawings, in which—

Figure 1:
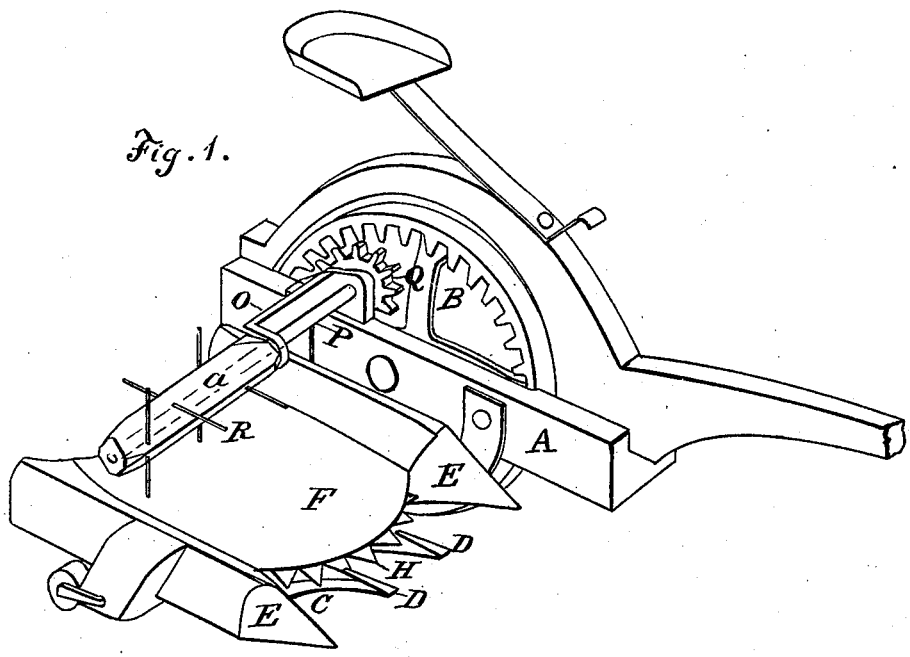
Figure 2:
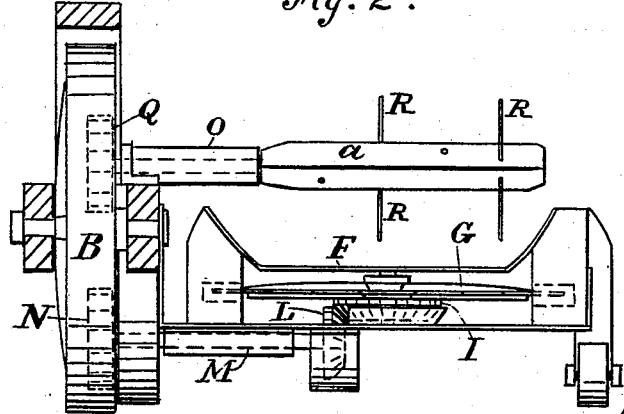

Figure 1 is a perspective view of my invention; and Fig. 2, a rear elevation, partly in section.

In the accompanying drawings, A is the main frame of my improved mower, provided with a central longitudinal slot, in the sides of which is journaled the axle of the driving-wheel B, which is provided with cogs on the inner face of its rim. C is the finger-bar or plate, attached to the main frame and provided with fingers D D. E E are dividers attached to the upper face of the finger-plate C, and connected together by the plate F, which forms the platform on which the cut grass is received when the machine is operated.

G represents a spoked wheel, having its rim serrated, to which the cutters H are attached. The axle of the wheel G is journaled in the finger-plate and platform, and its hub is provided with cogs I, which mesh with the teeth of the pinion L on the shaft M, having at its opposite end the pinion N, the teeth of which engage with the cogs on the inner face of the rim of the driving-wheel.

O is a bracket attached to the main frame, in which is journaled the inner end of the rake-shaft P, provided at its inner end with a pinion, Q, the teeth of which mesh with the cogs on the inner face of the rim of the driving-wheel.

The rake-shaft, beyond or outside of the bracket O, is provided with a wooden sleeve, a, rectangular or polygonal in cross-section, through which are driven or inserted, at suitable intervals, the continuous rods R, forming rake-teeth to discharge the grass from the platform.

What I claim as new, and desire to secure by Letters Patent, is—

The combination of the internal gear driving-wheel, the lower pinion, N, with its shaft extending horizontally out beneath the platform and actuating the cutting apparatus, and the upper pinion, Q, with its shaft extending horizontally out above the platform and bearing the tedding-reel, substantially as described.

A. J. BERRYHILL.

Witnesses:
M. B. TEMPLETON,
P. W. LOWE.